(12) United States Patent
Ran (10) Patent No.: US 10,990,956 B2
(45) Date of Patent: Apr. 27, 2021

(54) METHOD AND SYSTEM FOR PRESENCE BASED MOBILE PAYMENT

(71) Applicant: Alexander S. Ran, Palo Alto, CA (US)

(72) Inventor: Alexander S. Ran, Palo Alto, CA (US)

(73) Assignee: Intuit Inc., Mountain View, CA (US)

(*) Notice: Subject to any disclaimer, the term of this patent is extended or adjusted under 35 U.S.C. 154(b) by 516 days.

(21) Appl. No.: 13/893,958

(22) Filed: May 14, 2013

(65) Prior Publication Data

US 2014/0344085 A1 Nov. 20, 2014

(51) Int. Cl.
*G06Q 20/32* (2012.01)
*G06Q 20/20* (2012.01)
*G06Q 20/42* (2012.01)

(52) U.S. Cl.
CPC ......... *G06Q 20/327* (2013.01); *G06Q 20/20* (2013.01); *G06Q 20/42* (2013.01)

(58) Field of Classification Search
CPC ....... G06Q 20/237; G06Q 20/20; G06Q 20/42
USPC .......................................................... 705/21
See application file for complete search history.

(56) References Cited

U.S. PATENT DOCUMENTS

| | | | |
|---|---|---|---|
| 7,092,710 B1* | 8/2006 | Stoter | H04W 84/16 370/331 |
| 7,970,669 B1* | 6/2011 | Santos | G06Q 10/087 235/379 |
| 8,255,278 B1 | 8/2012 | Young et al. | |
| 2005/0187873 A1* | 8/2005 | Labrou et al. | 705/40 |
| 2009/0288012 A1* | 11/2009 | Hertel | G06Q 20/02 715/738 |
| 2010/0174599 A1* | 7/2010 | Rosenblatt et al. | 705/14.37 |
| 2010/0228639 A1* | 9/2010 | Gindele | G06Q 20/04 705/21 |
| 2010/0241527 A1* | 9/2010 | McKenna | G06Q 30/0601 705/26.1 |
| 2011/0246316 A1 | 10/2011 | Cincera | |
| 2011/0251892 A1* | 10/2011 | Laracey | G06Q 30/0253 705/14.51 |
| 2012/0191613 A1 | 7/2012 | Forbes et al. | |
| 2012/0203700 A1* | 8/2012 | Ornce | G06Q 20/3278 705/67 |
| 2012/0290336 A1* | 11/2012 | Rosenblatt | G06Q 30/02 705/5 |

(Continued)

OTHER PUBLICATIONS

International Search Report and Written Opinion issued in PCT/US2013/042129 dated Feb. 27, 2014 (10 pages).

(Continued)

*Primary Examiner* — Luna Champagne
(74) *Attorney, Agent, or Firm* — Ferguson Braswell Fraser Kubasta PC (57) ABSTRACT

A method for presence based mobile payment comprises receiving, from a user, a request for registration with a mobile payment service, registering, by the mobile payment service, the user based on the request, broadcasting, by a point of sale (PoS) system and through an advertising channel, an identification of a transaction, wherein the transaction comprises an item, wherein the advertising channel is used for discovery of available devices, and wherein the user is purchasing the item at the PoS system, receiving, from a mobile device of the user, a payment authorization for the transaction, and facilitating, by the mobile payment service, payment for the transaction.

17 Claims, 6 Drawing Sheets

(56) References Cited

U.S. PATENT DOCUMENTS

| | | | |
|---|---|---|---|
| 2013/0036050 A1* | 2/2013 | Giordano | G06Q 10/10 |
| | | | 705/44 |
| 2013/0097036 A1 | 4/2013 | Fisher | |
| 2013/0110658 A1 | 5/2013 | Lyman et al. | |
| 2013/0166399 A1* | 6/2013 | Awad | G06Q 30/0207 |
| | | | 705/16 |
| 2013/0275305 A1* | 10/2013 | Duplan | G06Q 20/322 |
| | | | 705/44 |
| 2013/0290096 A1* | 10/2013 | Lizotte, III | 705/14.45 |

OTHER PUBLICATIONS

International Preliminary Report on Patentability issued in PCT/US2013/042129 dated Nov. 26, 2015 (7 pages).
Office Action issued in counterpart Canadian Patent Application No. 2,911,448, dated Dec. 5, 2016 (4 pages).

* cited by examiner

METHOD AND SYSTEM FOR PRESENCE BASED MOBILE PAYMENT

BACKGROUND

Mobile payments are an easy and convenient way for consumers to pay for items, and are rapidly becoming ubiquitous. In fact, mobile payments are expected to reach $1.3 trillion annually by 2017. One of the faster growing areas of mobile payments is presence based mobile payments. Currently, presence based mobile payments may be performed using a variety of different standards, each having their own process for making payments. Any improvement to the current methods would speed the adaption of presence based mobile payments.

SUMMARY OF INVENTION

In general, in one or more aspects, the invention relates to a method for presence based mobile payment, comprising: receiving, from a user, a request for registration with a mobile payment service; registering, by the mobile payment service, the user based on the request; broadcasting, by a point of sale (PoS) system and through an advertising channel, an identification of a transaction, wherein the transaction comprises an item, wherein the advertising channel is used for discovery of available devices, and wherein the user is purchasing the item at the PoS system; receiving, from a mobile device of the user, a payment authorization for the transaction; and facilitating, by the mobile payment service, payment for the transaction.

In general, in one or more aspects, the invention relates to a non-transitory computer-readable medium (CRM) storing a plurality of instructions for presence based mobile payment, the plurality of instructions comprising functionality to: receive, from a user, a request for registration with a mobile payment service; register the user based on the request; broadcast, by a point of sale (PoS) system and through an advertising channel, an identification of a transaction, wherein the transaction comprises an item, wherein the advertising channel is used for discovery of available devices, and wherein the user is purchasing the item at the PoS system; receive, from a mobile device of the user, a payment authorization for the transaction; and facilitate, by the mobile payment service, payment for the transaction.

In general, in one or more aspects, the invention relates to a system for presence based mobile payment, comprising: a mobile payment service executing on a computer processor and comprising functionality to: receive, from a user, a request for registration; register the user based on the request; receive, from a mobile device of the user, a payment authorization for a transaction; facilitate payment for the transaction; a point of sale (PoS) system comprising functionality to: broadcast, through an advertising channel, an identification of the transaction, wherein the transaction comprises an item, wherein the advertising channel is used for discovery of available devices, and wherein the user is purchasing the item at the PoS system; and the mobile device of the user, wherein the mobile device comprises functionality to: receive the broadcast that identifies the transaction; and send the payment authorization for the transaction.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for presence based mobile payments. Specifically, an owner or user of a mobile device registers an account with a mobile payment service. After registering, the user of the mobile device may desire to purchase an item. A point of sale (PoS) system where the user is attempting to purchase the item broadcasts identification through an advertising channel. The mobile device of the user is able to receive the identification, and subsequently authorize the mobile payment service to pay for the item.

Figure 1A:
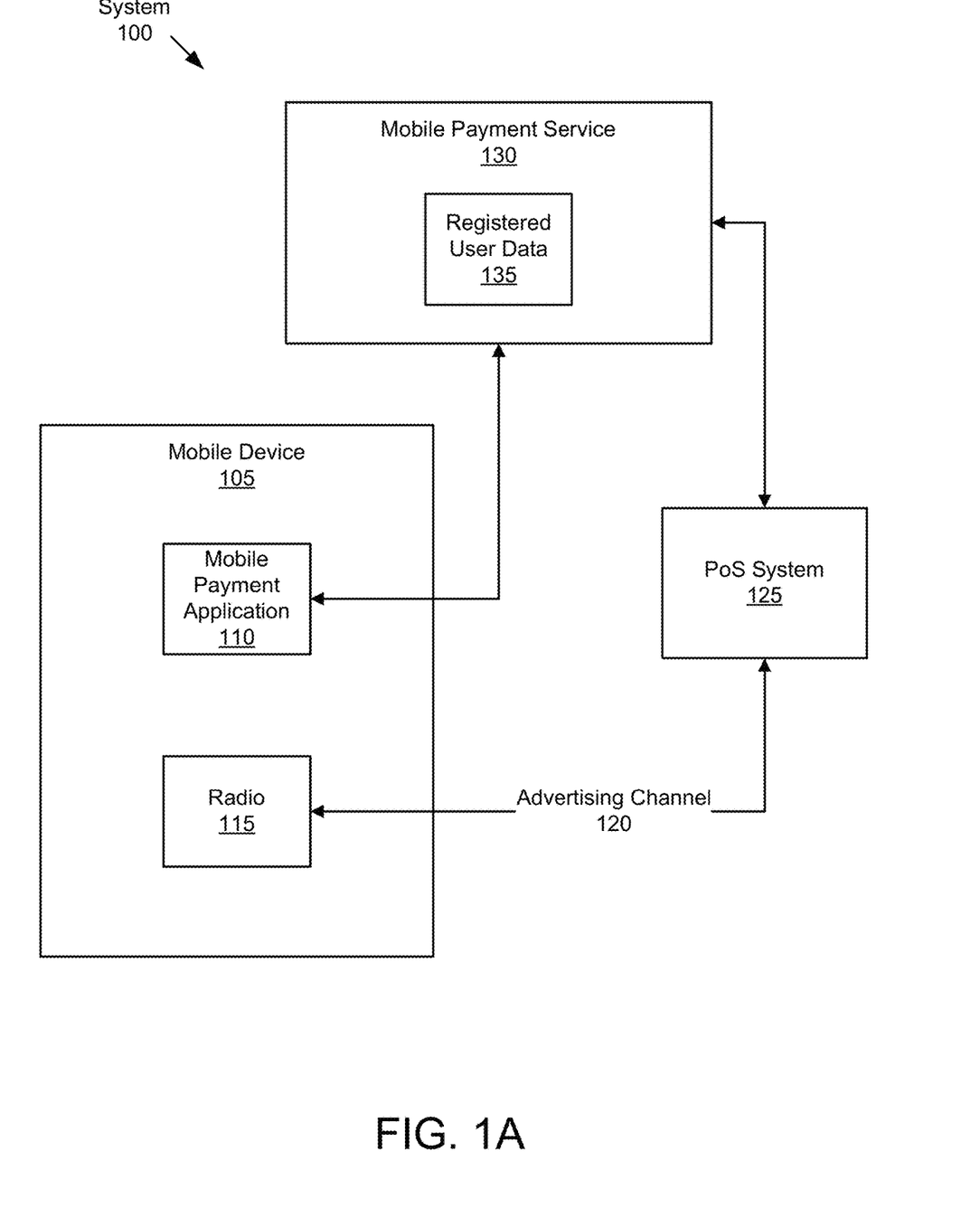
FIG. 1A shows a schematic diagram of a system in accordance with one or more embodiments of the invention.
Figure 1B:
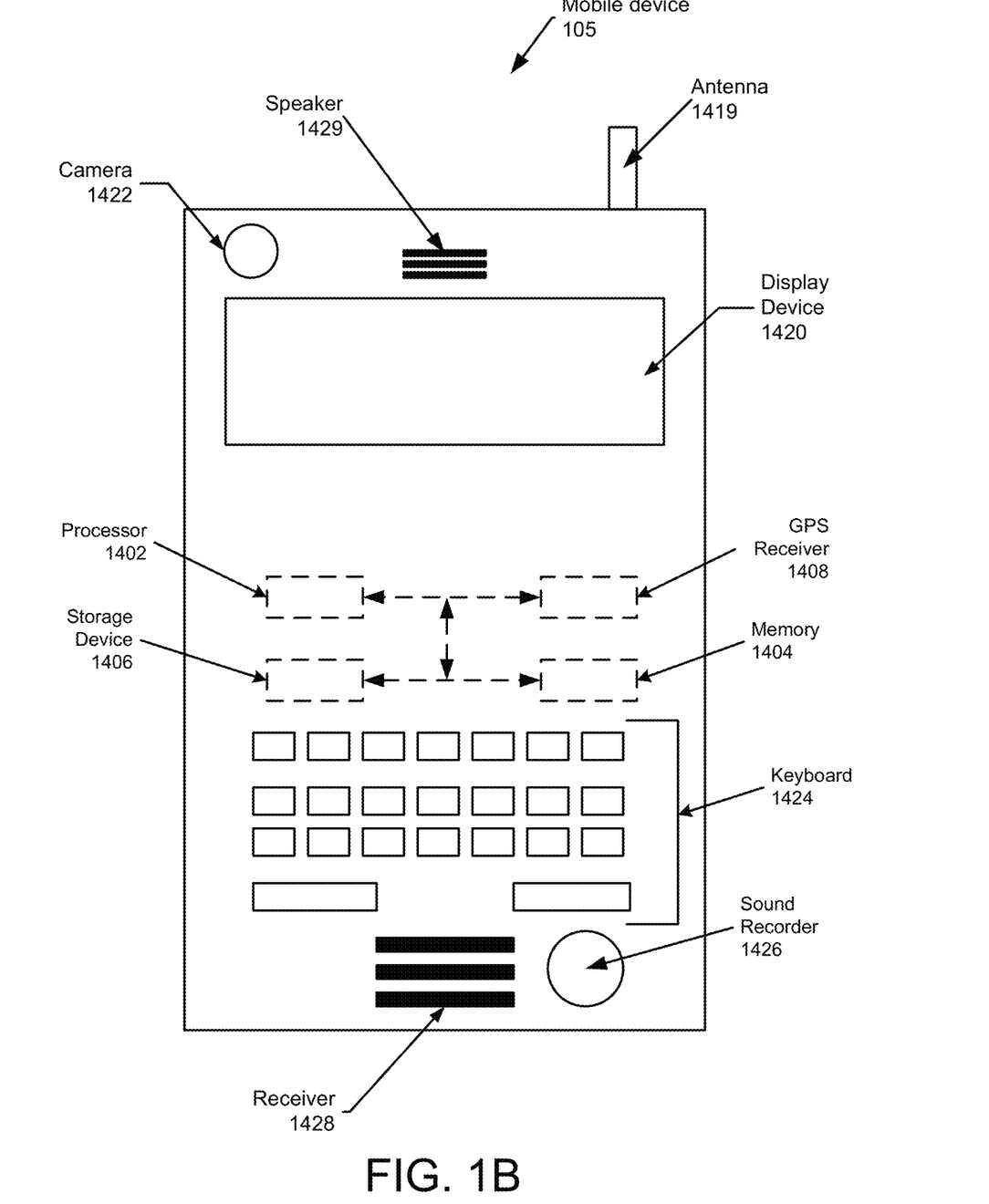
FIG. 1B shows a schematic diagram of a mobile device in accordance with one or more embodiments of the invention.

FIG. 1 shows a system for presence based mobile payments. In one or more embodiments of the invention, System (100) includes Mobile Device (105), Mobile Payment Application (110), Radio (115), Advertising Channel (120), PoS System (125), Mobile Payment Service (130), and Registered User Data (135). In one or more embodiments of the invention, Mobile Device (105) is a smartphone, cell phone, mobile phone, laptop computer, handheld gaming device, and/or any other mobile device. Mobile Device (105) may have many different elements, as described below in FIG. 1B. Further, Mobile Device (105) may have additional components or features that are not described in detail in FIG. 1B.

FIG. 1B shows Mobile Device (105) in detail, in accordance with one or more embodiments of the invention. Turning to FIG. 1B, in one or more embodiments of the invention, the Mobile Device (105) is a portable device that provides a user interface. Examples of mobile devices may include, but are not limited to, cellular phones, personal digital assistants, personal communicators, pagers, smart phones, or any other computing device. In one or more embodiments of the invention, as shown in FIG. 1B, the Mobile Device (105) may include a Processor (1402), Memory (1404) (e.g., RAM, cache memory, flash memory, etc.), a Storage device (1406) (e.g., a hard disk, an optical drive such as a compact disk drive or digital video disk (DVD) drive, a flash memory stick, etc.), a Global Positioning System (GPS) Receiver (1408), a Speaker (1429), a Receiver (1428), a Keyboard (1424), a Sound Recorder (1426), a Display Device (1420), a Camera (1422), and an Antenna (1419), and numerous other elements and functionalities typical of today's mobile devices (not shown).

Mobile Device (105) may include input means and output means, such as the Keyboard (1424), the Receiver (1428), and/or the Display Device (e.g., a liquid crystal display screen) (1420), which permits a user to enter and/or display keystrokes including numeric, alphabetic, and other characters, images, or other media types. Other input devices may include a Camera (1422), a Sound Recorder (1426), and/or other data recording mechanisms. Those skilled in the art will appreciate that these input and output means may take other forms now known or later developed.

Mobile Device (105) may be connected to a network (e.g., a local area network (LAN), a wide area network (WAN) such as the Internet, or any other similar type of network) via the Antenna (1419) or other network interface connection(s) (not shown). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from Mobile Device (105) with a mobile device identifier of the Mobile Device (105).

In one or more embodiments of the invention, the GPS Receiver (1408) includes functionality to obtain a location coordinate of the Mobile Device (105). Mobile Device (105) may be configured to use the GPS Receiver (1408) to provide latitude and longitude location coordinates.

Returning to FIG. 1A, in one or more embodiments of the invention, Mobile Payment Application (110) is an application that executes on Mobile Device (105). Mobile Payment Application (110) may be downloaded and/or installed by the owner or user of Mobile Device (105). Alternatively, Mobile Payment Application (110) may come pre-installed on Mobile Device (105). In one or more embodiments of the invention, Mobile Payment Application (110) is communicatively connected to PoS System (125) and Mobile Payment Service (130). Mobile Payment Application (110) may be connected to and/or communicate with Mobile Payment Service (130) in any manner now known or later developed, including, but not limited to, via a cell phone data plan, a wired or wireless internet connection, via Short Message Service (SMS) messages, Multimedia Messaging Service (MMS) messages, and/or any other suitable method. Mobile Payment Application is communicatively connected with PoS System (125) via Advertising Channel (120). In one or more embodiments of the invention, Mobile Payment Application (110) is able to register an account with Mobile Payment Service (130). Alternatively, a separate device, such as a computer, may register an account with Mobile Payment Service (130).

In one or more embodiments of the invention, Mobile Payment Application (110) is able to make mobile payments, using any communication standard now known or later developed. In particular, Mobile Payment Application (110) is able to receive identification information from PoS System (125), use the information to authorize a payment, and send the authorization to Mobile Payment Server (130). Alternatively, Mobile Payment Application (110) may be able to utilize an Advertising Channel (120) (described below), or other channel, of a communication standard to transmit the necessary data for a financial transaction. Specifically, in one or more embodiments of the invention, Mobile Payment Application (110) may alter the data included in broadcasts over Advertising Channel (120). Any data able to uniquely identify the user/owner of Mobile Device (105) may be included in the broadcasts over Advertising Channel (120). Thus, when a user of Mobile Device (105) is in communicative range, or a proximity threshold, of a merchant device (i.e., PoS System (125)), Mobile Payment Application (110) may use Advertising Channel (120) to broadcast information necessary to identify the user and complete a transaction or payment.

In one or more embodiments of the invention, Mobile Payment Application (110) dynamically changes the information included in the broadcasts over Advertising Channel (120). In other words, the information used to identify the user may change each time a broadcast is sent out over Advertising Channel (120). By dynamically changing the information included in broadcasts over Advertising Channel (120), Mobile Payment Application (110) may avoid replay attacks, among other methods of fraud. It will be apparent to one of ordinary skill in the art that there are many ways to dynamically alter the content of broadcasts over Advertising Channel (120) and, as such, the invention should not be limited to the above examples.

In one or more embodiments of the invention, Radio (115) is a near field communication radio, Bluetooth™ radio, Bluetooth™ Low Energy radio, or other similar device/component. Bluetooth™ is a registered mark of Bluetooth SIG. Radio (115) should not be limited exclusively to the above standards, as many other standards exist, and the invention may be used on any communication standard. Radio (115) is able to communicate with point of sale systems of merchants (i.e., PoS System (125)) via Advertising Channel (120) to provide the necessary financial information necessary to complete a transaction. In one or more embodiments of the invention, Radio (115) has a limited distance, or proximity threshold, that may be determined by the communication standard used by Radio (115).

In one or more embodiments of the invention, Advertising Channel (120) is a channel that Radio (115) uses for discovery of devices and services available in the vicinity. In one or more embodiments of the invention, upon establishment of a connection, communication continues on a channel separate from Advertising Channel (120). Alternatively, there may be no further communication needed beyond that done over Advertising Channel (120). Depending on the standard used, there may be only one Advertising Channel (120). Alternatively, there may be multiple Advertising Channels (120). In one or more embodiments of the invention, the communication standard used allows for custom user data to be included in the broadcasts sent via Advertising Channel (120), and Mobile Payment Application (110) is responsible for adding the necessary information to the broadcasts on Advertising Channel (120). In one or more embodiments of the invention, by including all the information necessary for a transaction in the broadcasts over Advertising Channel (120), there is no need for the present invention to establish a formal connection (i.e., a pairing) with PoS terminals. It will be apparent to one of ordinary skill in the art that there are many ways to configure and use an advertising channel and, as such, the invention should not be limited to the above examples.

In one or more embodiments of the invention, PoS System (125) is a point of sale system of a merchant. PoS System (125) may be of any type including, but not limited to: a stand-alone terminal, a smartphone, a server, a computer, and/or any other suitable device. PoS System (125) may be owned by the store in which PoS System (125) is located. Alternatively, a third party may own or control PoS System (125). PoS System (125) is able to communicate with Radio (115) of Mobile Device (105) using any standard now known or later developed. In one or more embodiments of the invention, there is an application (not shown) executing on PoS System (125) for communicating with Mobile Payment Service (130) and Mobile Device (105). Specifically, PoS System (125) includes functionality to broadcast identification over Advertising Channel (120). The identification may be anything identifiable by a user/customer who wishes to purchase an item at PoS System (125) with the aid of the software on user's device, or with the aid of the payment service that facilitates the transaction.

Alternatively, in another embodiment of the invention, PoS System (125) is able to authenticate the user of Mobile Device (105) using information received from Mobile Payment Service (130). The authentication may take any form now known or later developed including, but not limited to: date of birth, name, address, Personal Identification Number (PIN), a secret question/answer, a picture, and/or any other suitable method. In one or more embodiments of the invention, PoS System (125) is able to authenticate the user of Mobile Device (105) without human intervention. Alternatively, the authentication may be completed by, for example, the employee operating PoS System (125). It will be apparent to one of ordinary skill in the art that PoS System (125) may take many different forms and, as such, the invention should not be limited to the above examples.

In one or more embodiments of the invention, Mobile Payment Service (130) is an application executing on a computing device, such as: a server, computer, laptop, smart phone, or other suitable device. Mobile Payment Service (130) is communicatively connected with at least Mobile Device (105) and PoS System (125). Thus, in one or more embodiments of the invention, Mobile Payment Service (130) is a closed system—both the merchants and the consumers are connected with Mobile Payment Service (130). In one or more embodiments of the invention Mobile Payment Service (130) is responsible for establishing user accounts and maintaining user data (i.e., Registered User Data (135)). Accounts may be established in any method now known or alter developed. Mobile Payment Service (130) may respond to queries from Mobile Device (105) and/or PoS System (125), such as authentication requests, requests for payment information, transaction line item detail information, and/or any other information necessary for completing a transaction. It will be apparent to one of ordinary skill in the art that Mobile Payment Service (130) facilitates proximity based payment transactions and, as such, the invention should not be limited to the above examples.

In one or more embodiments of the invention, Mobile Payment Service (130) may authenticate transaction requests in any manner now known or later developed. For example, Mobile Payment Service (130) may send a question(s) to PoS System (125) or Mobile Device (105) which, upon receiving a correct answer, will authenticate the transaction. It will be apparent to one of ordinary skill in the art that there are many ways to authenticate a transaction and, as such, the invention should not be limited to the above examples. Further, Mobile Payment Service (130) includes functionality for facilitating payment for transactions. Facilitating payment may include transferring funds, communicating payment information to a PoS System, mobile device, or a $3^{rd}$ party, and/or any other actions for facilitating a payment.

In one or more embodiments of the invention, Registered User Data (135) is data about a registered user of the Mobile Payment Service (135) (i.e., the user or owner of Mobile Device (105)). Registered User Data (135) may include any data about the user, and may be stored in any format or method now known or later developed. For example, Registered User Data (135) may include, but is not limited to: a phone number or identification of Mobile Device (105), date of birth, address, marital status, picture(s), a series of secret question/answers, a PIN, a username, a customer identification number, one or more passwords, payment account data, and/or any other suitable information. In one or more embodiments of the invention, the payment account data may be for any type of financial account including, but not limited to: credit cards, debit cards, checking accounts, saving accounts, pre-paid cards, gift cards, electronic payment accounts, coupons, frequent shopper cards, and/or any other account that may be used in a transaction. In one or more embodiments of the invention, Registered User Data (135) is used in an authentication process. It will be apparent to one of ordinary skill in the art that Registered User Data (135) may include any data about a user and, as such, the invention should not be limited to the above examples.

Figure 2A:
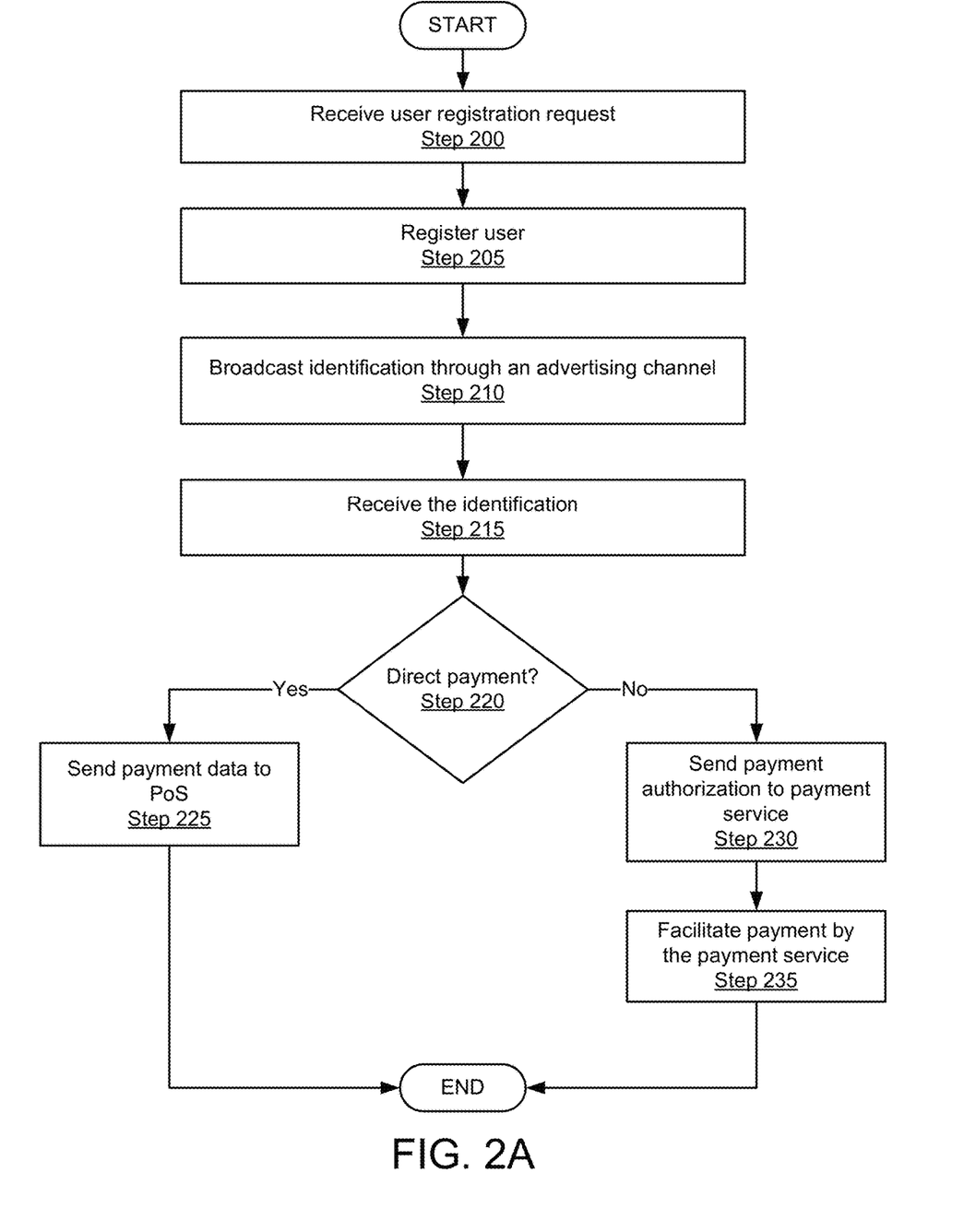
FIGS. 2A and 2B show flowcharts of a method in accordance with one or more embodiments of the invention.
Figure 2B:
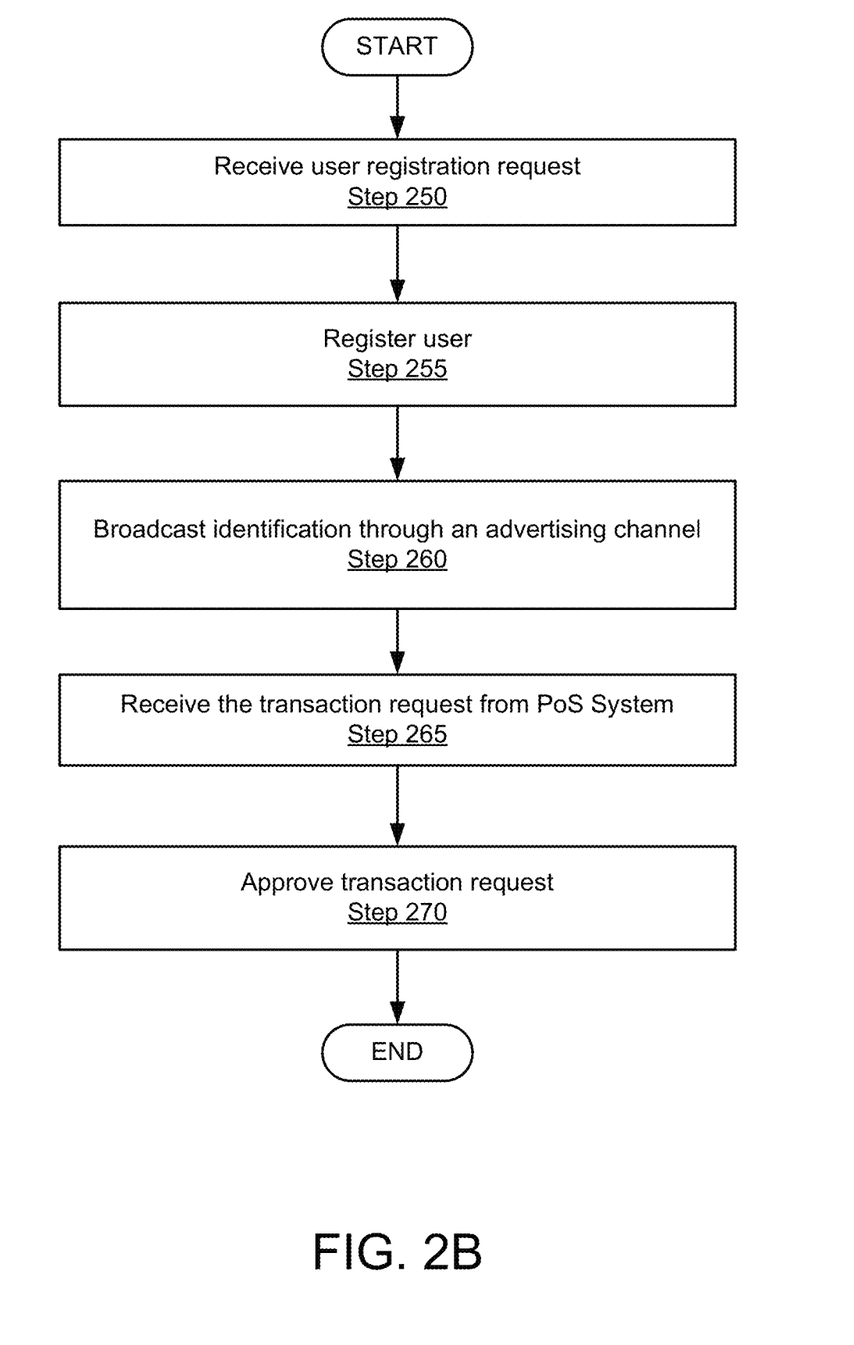

FIGS. 2A and 2B show a flowchart of a method for presence based mobile payment. While the various steps in this flowchart are presented and described sequentially, one of ordinary skill in the art will appreciate that some or all of the steps may be executed in different orders and some or all of the steps may, be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, a user registration request is received in accordance with one or more embodiments of the invention. The registration request may be received from a mobile device of a user, or by some other suitable computing device such as a computer. In one or more embodiments of the invention, the registration request contains user data including, but not limited to: name, date of birth, address, employment, password(s), username(s), secret question/answers, pictures, credit card data, debit card data, checking account data, savings account data, pre-paid card data, gift card data, and/or any other suitable information.

In Step 205, the user is registered in accordance with one or more embodiments of the invention. The user may be registered in any method now known or later developed.

In Step 210, identification is broadcasted through an advertising channel in accordance with one or more embodiments of the invention. The identification is broadcast by a PoS terminal using an advertising channel which the communication standard uses for identification of nearby devices and services. In one or more embodiments of the invention, the communication standard allows for dynamic attributes on the advertising channel. The identification is unique to the specific PoS which sent the broadcast and identifies directly or indirectly the specific transaction. The identification may include a number or other identifier associated with the PoS, which a customer is able to associate with the PoS (e.g., a sign on the PoS stating, "This is PoS 1234" and the broadcast includes 1234 as part of the identifier). Such a sign may be implemented as a bar code or QR code as well as other form of alternative identification. Alternatively, or in addition, the identifier may include information about a transaction, such as one or more items which the customer is about to purchase, the total amount of the purchase, etc. In other words, any identifier that is recognizable to the customer in some way may be used as a portion of the broadcast. In one or more embodiments of the invention, the broadcast has a limited range, and only devices within the proximity threshold are able to detect the broadcast, and thus are available for communication. The proximity threshold may be any amount, such as: 1 foot, 5, feet, 50 feet, 100 feet, or any other distance. In one or more embodiments of the invention, the proximity threshold is the effective range of the communication standard being used.

In Step 215, the identification is received, in accordance with one or more embodiments of the invention. The identification is received by a mobile device of a user/customer that is purchasing goods. The identification may be received via an advertising channel and may contain any information as described in Step 210.

In Step 220, a determination is made whether the payment will be made directly to the PoS, or whether a mutual third party (i.e., a mobile payment service provider) will handle the payment. If a third party is handling the payment, the method proceeds to Step 230. If the payment is direct from the mobile device to the PoS, the method proceeds to Step 225.

In Step 225, payment data is sent to the PoS, in accordance with one or more embodiments of the invention. The payment data may be sent in any manner now known or later developed. Specifically, the payment data is sent over a secure connection between the mobile device and the PoS. The payment data may be specific payment account data, such as a bank account, or may be an identifier of an account at a mobile payment service provider, or any other suitable data. After Step 225 the method ends.

In Step 230, a payment authorization is sent to the payment service, in accordance with one or more embodiments of the invention. The authorization is sent from a mobile device of a user/customer who is about to purchase something from a PoS. Specifically, the payment authorization may include information identifying the PoS or the merchant from which the user/customer is purchasing goods as well as the specific transaction, such as the information, or portions of the information, broadcast by the PoS in Step 210.

In Step 235, payment is facilitated by the payment service, in accordance with one or more embodiments of the invention. The payment may be facilitated and/or made in any manner now known or later developed. A proof of payment can be delivered to the PoS either directly by the Mobile Payment Service provider or through a consumer device utilizing the proximity communication channel. After Step 235, the method ends.

FIG. 2B shows an alternative method for presence based mobile payment. In Step 250, a user registration request is received in accordance with one or more embodiments of the invention. Step 250 may be performed identically to Step 200.

In Step 255, the user is registered in accordance with one or more embodiments of the invention. The user may be registered in any method now known or later developed.

In Step 260, identification is broadcasted through an advertising channel in accordance with one or more embodiments of the invention. The identification is broadcasted by a mobile device of the user, and the advertising channel is the channel which the communication standard uses for identification of available nearby devices. In one or more embodiments of the invention, the broadcast has a limited range, and only devices within the proximity threshold are able to detect the broadcast, and thus are available for communication. The proximity threshold may be any amount, such as: 1 foot, 5, feet, 50 feet, 100 feet, or any other distance. In one or more embodiments of the invention, the proximity threshold is the effective range of the communication standard being used.

In one or more embodiments of the invention, the identification broadcasted through the advertising channel is a financial account of the user, among other data. Thus, a PoS system that receives the broadcast is able to charge the identified financial account for a transaction without having to formally pair with the user's device, although the user's authorization for the transaction is mandatory. Optionally, the user does not even need to access their mobile phone to complete the transaction, as the PoS system may query the mobile payment service to authorize the transaction and/or confirm the users account. The identification broadcasted may be of any kind. In one or more embodiments of the invention, the broadcasts to the advertising channel may run, passively, the background of the mobile device, and may occur at any frequency.

In one or more embodiments of the invention the information included in the broadcasts over the advertising channel dynamically changes. In other words, the information used to identify the user may change each time a broadcast is sent out or may change at any other frequency. By dynamically changing the information included in broadcasts various methods of fraud may be avoided.

In Step 265, a transaction request is received from a PoS system in accordance with one or more embodiments of the invention. The transaction request may be received in any manner now known or later developed. In one or more embodiments of the invention, the transaction request includes the identifier broadcast by the mobile device of the user, so that the mobile service provider can authenticate the user and/or confirm that they have an active account.

In Step 270, the transaction request is approved in accordance with one or more embodiments of the invention. The transaction request may be approved in any manner now known or later developed. In one or more embodiments of the invention, the approval may result from a simple check to ensure that the data received from the PoS system identifies a registered user of the mobile payment system. Alternatively, the approval may be based on the user providing a correct answer to a dynamically generated challenge question. The mobile payment system may send the challenge question directly to the user's mobile device, or it may be sent to the PoS system, and the transaction would be approved pending the user's correct answering of the challenge question.

The following section describes various examples of the invention. The examples are included to aid in the understanding of the invention and are not intended to limit the scope of the invention.

Figure 3:
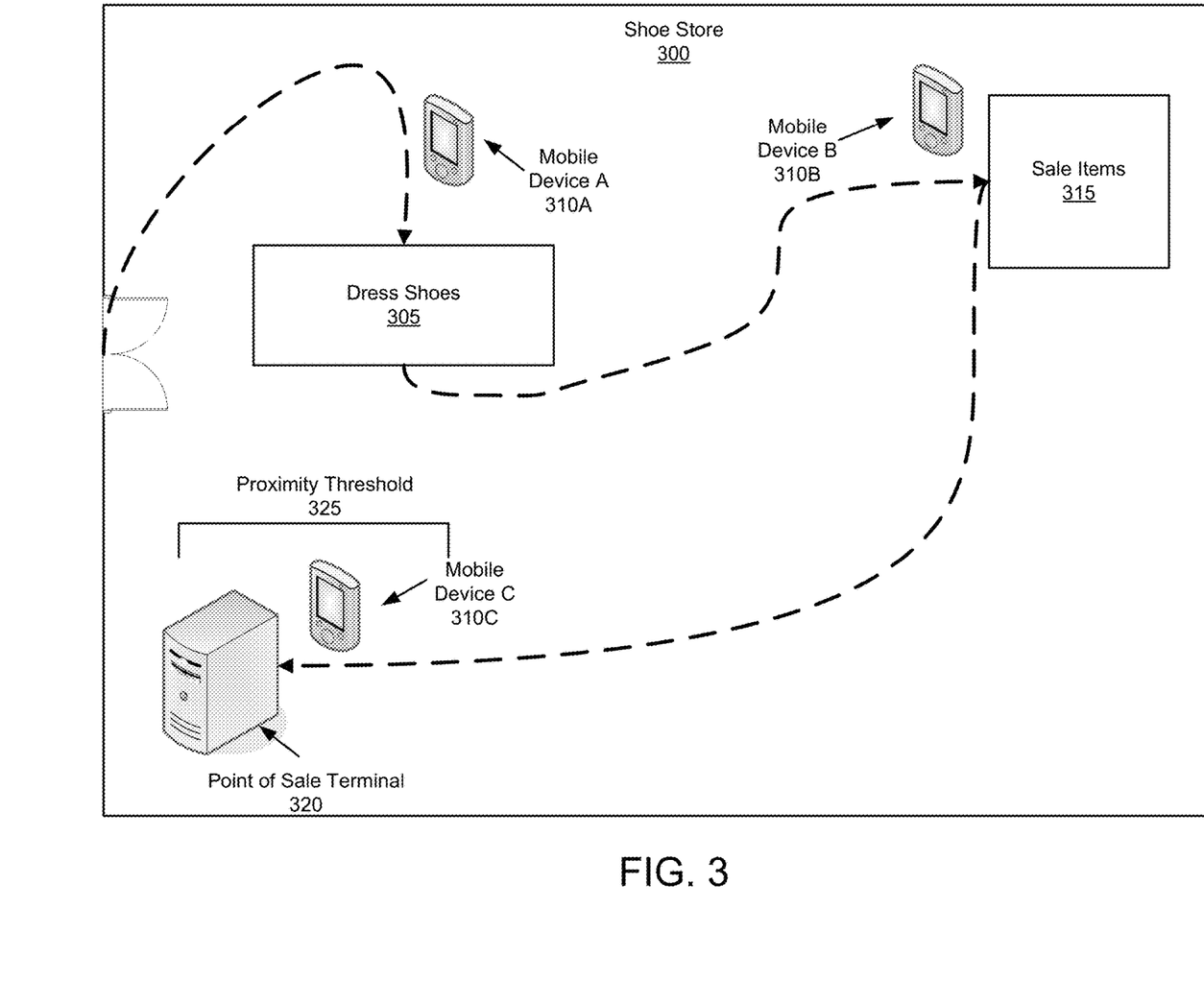
FIG. 3 shows an example in accordance with one or more embodiments of the invention.

FIG. 3 shows an example of a method for presence based mobile payments. Specifically, FIG. 3 shows Shoe Store (300), which is a physical store selling shoes. In particular, Shoe Store (300) has a display of Dress Shoes (305) and a rack for Sale Items (315). In FIG. 3, a user enters Shoe Store (300) carrying Mobile Device A (310A) and proceeds to browse the Dress Shoes (305), as shown by the dotted line. For the purposes of this example, the user's mobile device has previously installed the mobile payment application of the present invention, and the user has also registered with the mobile payment service. Thus, the user's mobile device is periodically using the advertising channel to search for available devices, while Point of Sale Terminal (320) is broadcasting identification information. However, at the first stop Mobile Device A (310A) is not within Proximity Threshold (325) of the Point of Sale Terminal (320), and thus, Mobile Device A (310A) does not receive the identification information at this point in time.

After browsing the Dress Shoes (305), the user moves on to the rack of Sale Items (315), as shown by the dotted line leading to Mobile Device B (310B). Again, Mobile Device B (310B) is not within Proximity Threshold (325) so, although identification information is being broadcast through the advertising channel by Point of Sale Terminal (320), Mobile Device B (310B) is too far away to receive it. However, a broadcast is still sent searching for available device with which to communicate. After selecting a pair of shoes from Sale Items (315) that the user would like to purchase, the user moves towards Point of Sale Terminal (320). Now, Mobile Device C (310C) is within the Proximity Threshold (325) of the Point of Sale Terminal (320). Thus, the user will be able to complete the purchase of the pair of shoes using the method of the invention.

Specifically, Mobile Device C (310C) receives a broadcast from Point of Sale Terminal (320) that includes the identification information "terminal 1234." The user of Mobile Device C (310C) may then authorize the purchase of the shoes at Point of Sale Terminal (320), and a message will be sent to a mobile payment service. The mobile payment service subsequently facilitates the payment to the merchant for the shoes by moving funds from purchaser's account with the mobile payment service to the merchant's account with the mobile payment service, and the transaction is completed.

The method of the present invention provides a streamlined method for presence based mobile payments. Further, the method is very fast because no formal pairing/exchange of security keys needs to occur. Further still, the method has the advantage that the user need not interact with their mobile device to complete a payment. The user may simply leave the mobile device in their pocket, and the mobile device will periodically check for available devices on the advertising channel. Then, when the user is within the proximity threshold of the PoS system, the periodic broadcast will send all information necessary to the PoS system and/or the PoS system broadcasts all information necessary to the mobile device of the user. It will be apparent to one of ordinary skill in the art that there are many communication standards on which the method of the present invention may be performed and, as such, the invention should not be limited to any specific communication standard. Further, it will be apparent to one of ordinary skill in the art that there are many ways to safely and securely authorize, confirm, deny, or otherwise approve a transaction and, as such, the invention should not be limited to any of the examples discussed above.

Figure 4:
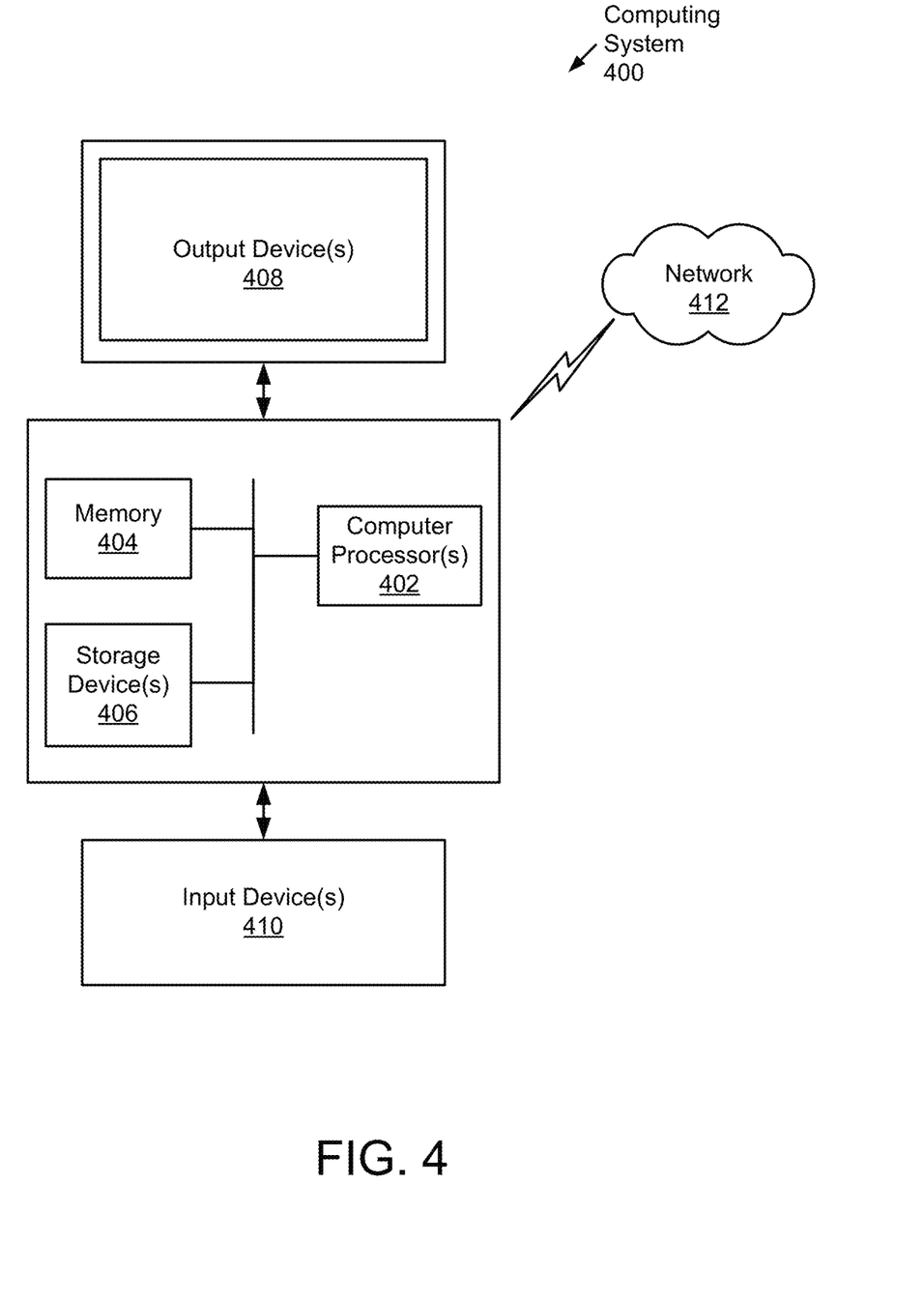
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the Computing System (400) may include one or more Computer Processor(s) (402), associated Memory (404) (e.g., random access memory (RAM), cache memory, flash memory, etc.), one or more Storage Device(s) (406) (e.g., a hard disk, an optical drive such as a compact disk (CD) drive or digital versatile disk (DVD) drive, a flash memory stick, etc.), and numerous other elements and functionalities. The Computer Processor(s) (402) may be an integrated circuit for processing instructions. For example, the Computer Processor(s) (402) may be one or more cores, or micro-cores of a processor. The computing system (400) may also include one or more Input Device(s) (410), such as a touchscreen, keyboard, mouse, microphone, touchpad, electronic pen, or any other type of input device. Further, the Computing System (400) may include one or more Output Device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The Computing System (400) may be connected to a Network (412) (e.g., a local area network (LAN), a wide area network (WAN) such as the Internet, mobile network, or any other type of network) via a network interface connection (not shown). The input and output device(s) may be locally or remotely (e.g., via the Network (412)) connected to the Computer Processor(s) (402), Memory (404), and Storage Device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned Computing System (400) may be located at a remote location and connected to the other elements over a Network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for presence based mobile payment, comprising:

receiving, from a user, a request for registration with a mobile payment service;

registering, by the mobile payment service, the user based on the request, wherein registering includes receiving a plurality of information items identifying the user;

receiving, from a point of sale system (PoS), one or more of the information items from the plurality of information items, and a payment authorization for a transaction, wherein the one or more information items is broadcast through an advertising channel by a mobile device to the PoS in accordance with a communication standard without pairing the PoS to the mobile device, wherein the advertising channel is a channel of the communication standard and is used for identification of available nearby devices, wherein the one or more information items broadcasted over the advertising channel includes a financial account of the user, wherein the payment authorization authorizes payment from a payment account of the user, and wherein at least one of the broadcasted information items changes each time the broadcast is sent out to avoid fraud; and facilitating, by the mobile payment service, payment for the transaction.

2. The method of claim 1, wherein the payment authorization is sent by the mobile device to the mobile payment service without establishing a formal connection with the PoS system.

3. The method of claim 2, wherein the payment authorization comprises a bank account.

4. The method of claim 1, wherein the user and the PoS system are within a threshold distance.

5. The method of claim 1, wherein the communication standard is a Bluetooth Low Energy format.

6. The method of claim 1, wherein the mobile device is a smartphone.

7. A non-transitory computer-readable medium (CRM) storing a plurality of instructions for presence based mobile payment, the plurality of instructions comprising functionality to:

receive, from a user, a request for registration with a mobile payment service;

register, by the mobile payment service, the user based on the request, wherein registering includes receiving a plurality of information items identifying the user;

receive, from a point of sale system (PoS), one or more of the information items from the plurality of information items, and a payment authorization for a transaction, wherein the one or more information items is broadcast through an advertising channel by a mobile device to the PoS in accordance with a communication standard without pairing the PoS to the mobile device, wherein the advertising channel is a channel of the communication standard and is used for identification of available nearby devices, wherein the one or more information items broadcasted over the advertising channel includes a financial account of the user, wherein the payment authorization authorizes payment from a payment account of the user, and wherein at least one of the broadcasted information items changes each time the broadcast is sent out to avoid fraud; and facilitate, by the mobile payment service, payment for the transaction.

8. The non-transitory CRM of claim 7, wherein the payment authorization is sent by the mobile device to the mobile payment service without establishing a formal connection with the PoS system.

9. The non-transitory CRM of claim 8, wherein the payment authorization comprises a bank account.

10. The non-transitory CRM of claim 7, wherein the user and the PoS system are within a threshold distance.

11. The non-transitory CRM of claim 7, wherein the communication standard is a Bluetooth Low Energy format.

12. The non-transitory CRM of claim 7, wherein the mobile device is a smartphone.

13. A system for presence based mobile payment, comprising:

a mobile payment service executing on a computer processor and comprising functionality to:

receive, from a user, a request for registration with a mobile payment service;

register, by the mobile payment service, the user based on the request, wherein registering includes receiving a plurality of information items identifying the user;

receive, from a point of sale system (PoS), one or more of the information items from the plurality of information items, and a payment authorization for a transaction, wherein the one or more information items is broadcast through an advertising channel by a mobile device to the PoS in accordance with a communication standard without pairing the PoS to the mobile device, wherein the advertising channel is a channel of the communication standard and is used for identification of available nearby devices, wherein the one or more information items broadcasted over the advertising channel includes a financial account of the user, wherein the payment authorization authorizes payment from a payment account of the user, and wherein at least one of the broadcasted information items changes each time the broadcast is sent out to avoid fraud; and facilitate, by the mobile payment service, payment for the transaction.

14. The system of claim 13, wherein the payment authorization is sent by the mobile device to the mobile payment service without establishing a formal connection with the PoS system.

15. The system of claim 14, wherein the payment authorization comprises a bank account.

16. The system of claim 13, wherein the user and the PoS system are within a threshold distance.

17. The system of claim 13, wherein the communication standard is a Bluetooth Low Energy format.

* * * * *